United States Patent
Rouis et al.

(10) Patent No.: US 8,475,328 B2
(45) Date of Patent: Jul. 2, 2013

(54) MICRO-HYBRID SYSTEM FOR MOTOR VEHICLE INCORPORATING PILOTING STRATEGIES MODULE

(75) Inventors: Oussama Rouis, Levallois Perret (FR); Farouk Boudjemai, Marcoussis (FR); Brice Lecole, Paris (FR); Julien Masfaraud, Paris (FR); Magali Laurence, Paris (FR); Mattieu Treguer, Maisons Alfort (FR); Hugues Doffin, Chatenay Malabry (FR); Cedric Leboeuf, Creteil (FR); Ertugrul Taspinar, Sucy en Brie (FR); Paul Armiroli, Marolles en Brie (FR); Alain Gerard, Le Perreux (FR); Jean-Marc Dubus, Evry (FR); Arnaud De Vries, Vanves (FR); Eric Blanc, Alfortville (FR)

(73) Assignee: Valeo Equipements Electriques Moteur, Creteil (FR)

( * ) Notice: Subject to any disclaimer, the term of this patent is extended or adjusted under 35 U.S.C. 154(b) by 614 days.

(21) Appl. No.: 12/303,771

(22) PCT Filed: May 4, 2007

(86) PCT No.: PCT/FR2007/051224
§ 371 (c)(1),
(2), (4) Date: Aug. 9, 2010

(87) PCT Pub. No.: WO2008/000980
PCT Pub. Date: Jan. 3, 2008

(65) Prior Publication Data
US 2010/0298088 A1 Nov. 25, 2010

(30) Foreign Application Priority Data

Jun. 27, 2006 (FR) ...................................... 06 52676

(51) Int. Cl.
*B60L 9/00* (2006.01)
*B60L 11/00* (2006.01)
*B60K 1/02* (2006.01)
*H02P 1/00* (2006.01)
*H02P 3/00* (2006.01)
*H02P 7/00* (2006.01)
*B60W 10/30* (2006.01)
*B60W 20/00* (2006.01)

(52) U.S. Cl.
USPC ........... 477/3; 477/7; 180/65.27; 180/65.275; 701/22

(58) Field of Classification Search
USPC .............. 477/3, 7; 701/22; 180/65.27, 65.275
See application file for complete search history.

(56) References Cited

U.S. PATENT DOCUMENTS

| 5,345,154 A | 9/1994 | King |
| 5,965,991 A | 10/1999 | Koike et al. |

(Continued)

FOREIGN PATENT DOCUMENTS

| DE | 102007050773 A1 * | 4/2009 |
| WO | WO 0032438 A1 * | 6/2000 |

*Primary Examiner* — Tisha Lewis
(74) *Attorney, Agent, or Firm* — Berenato & White, LLC

(57) ABSTRACT

The micro-hybrid system for a transport vehicle comprises a rotary electric machine suitable for being coupled mechanically to an engine of the vehicle, an AC-to-DC converter, a DC-to-DC converter, first and second electrical energy reservoirs suitable for storing an electrical energy produced by the rotary machine and for returning the electrical energy to consumer devices equipping the vehicle, and a controller for controlling the operation of the micro-hybrid system. The controller comprises piloting strategies module suitable for autonomously piloting the operating modes of the micro-hybrid system according to a plurality of strategies depending on information provided to said piloting means regarding an internal state of the micro-hybrid system and of a state of the vehicle.

16 Claims, 9 Drawing Sheets

U.S. PATENT DOCUMENTS

| | | |
|---|---|---|
| 6,234,932 B1 | 5/2001 | Kuroda et al. |
| 6,365,983 B1 | 4/2002 | Masberg et al. |
| 6,546,320 B2 * | 4/2003 | Shimizu et al. ............... 701/22 |
| 6,549,832 B2 * | 4/2003 | Nakasako et al. ............. 701/22 |
| 6,728,607 B1 * | 4/2004 | Anderson ...................... 701/25 |
| 7,537,070 B2 * | 5/2009 | Maslov et al. ............ 180/65.25 |
| 7,689,331 B2 * | 3/2010 | Moran ............................ 701/22 |
| 2002/0109407 A1 | 8/2002 | Morimoto et al. |
| 2002/0116100 A1 * | 8/2002 | Shimazaki et al. ............. 701/22 |
| 2004/0108831 A1 | 6/2004 | Cartwright et al. |
| 2005/0088139 A1 | 4/2005 | Frank |
| 2008/0278869 A1 * | 11/2008 | Rehm et al. .................... 361/23 |

* cited by examiner

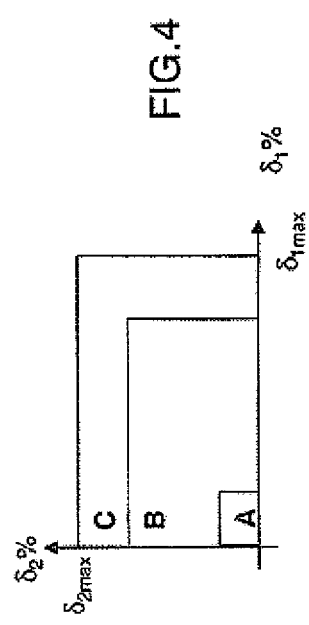
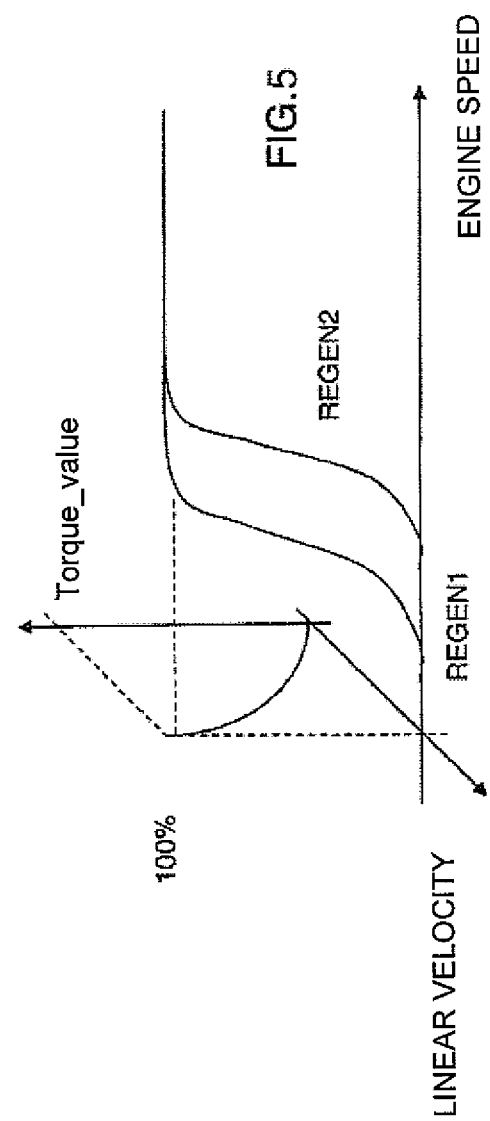

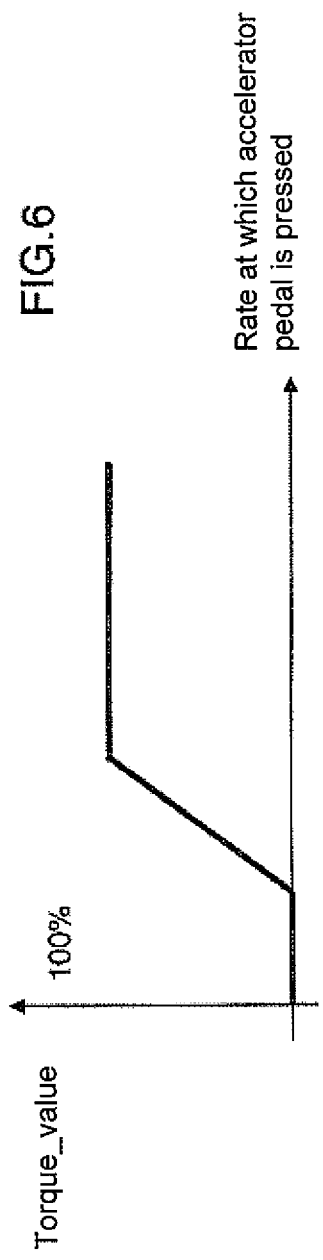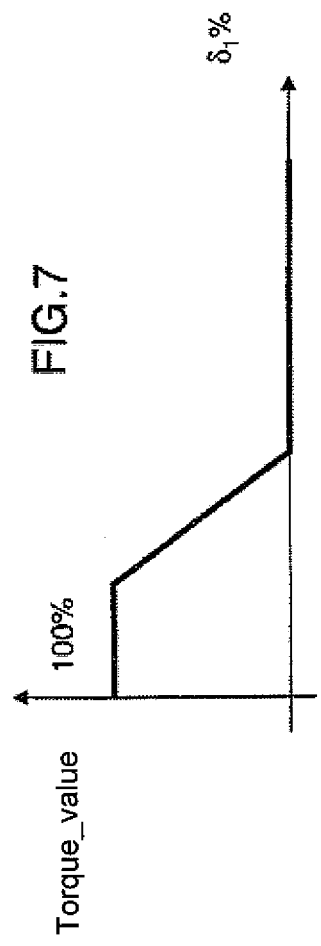

MICRO-HYBRID SYSTEM FOR MOTOR VEHICLE INCORPORATING PILOTING STRATEGIES MODULE

CROSS-REFERENCE TO RELATED APPLICATIONS AND CLAIM TO PRIORITY

This application relates to International Application No. PCT/FR2007/051224 filed May 4, 2007 and French Patent Application No. 06/52676 filed Jun. 27, 2006, of which the disclosures are incorporated herein by reference and to which priority is claimed.

BACKGROUND OF THE INVENTION

1. Field of the Invention

The present invention concerns, in a general manner, micro-hybrid systems for vehicles, in particular motor vehicles.

More particularly, the present invention concerns a micro-hybrid system, comprising a rotary electrical machine mechanically coupled to the thermal engine of the vehicle, an AC-to-DC converter, a DC-to-DC converter, electrical energy storage devices to store electrical energy produced by the rotary electrical machine and a control unit.

2. Description of the Related Art

In micro-hybrid devices of the above type known in the art, the rotary electrical machine is generally an alternator-starter which, apart from performing the functions of thermal engine starter and alternator, may also be called on for a function of regenerative braking and a function of torque assist (also referred to as "boost" in English).

The electrical energy recuperated by the regenerative braking can be stored in ultra-high capacity capacitors known as "UCAPs" or "supercapacitors" by the person skilled in the art and used to power an on-board network under fluctuating DC voltage. This on-board network under fluctuating DC voltage is separate from the classic 12V network fitted to motor vehicles and supplements it by taking particular responsibility for the electrical supply to consumer devices capable of accepting a fluctuating voltage of over 12V.

In these micro-hybrid devices of prior art, the control unit operates in slave mode and is driven by an electronic control unit of the vehicle according to the vehicle's own control laws and governed by said vehicle.

SUMMARY OF THE INVENTION

The object of the present invention is to provide a micro-hybrid system of a new type in which all the intelligence necessary to pilot the micro-hybrid system is integrated in the micro-hybrid system itself, thus offering an integrated equipment which minimizes its demands on the system of the vehicle and in which it becomes possible to incorporate sophisticated piloting strategies which are perfectly adapted to the sub-assemblies composing the micro-hybrid system.

The micro-hybrid system for a transport vehicle comprises a rotary electrical machine suitable for coupling mechanically to an engine of the vehicle, an AC-to-DC converter, a DC-to-DC converter, first and second electrical energy storage devices capable of storing electrical energy produced by the rotary machine and of returning said energy to supply the consumer devices with which the vehicle is fitted, and control means to control the operation of the micro-hybrid system.

According to the invention, the control means comprise piloting means which are capable simultaneously of autonomously piloting the operating modes of the micro-hybrid system according to a plurality of strategies depending on at least information provided to the piloting means regarding an internal state of the micro-hybrid system and of a state of the vehicle and capable of piloting, in slave mode, the operating modes in accordance with the instructions contained in the external demands originating from a system of the vehicle.

The present invention allows the efficiency of the production of electricity to be optimized, with a view to reducing the vehicle's fuel consumption. This result is achieved in particular due to the management of the mechanical loads (alternator) on the thermal engine and of the electrical loads on the electricity power distribution system.

According to another characteristic, the piloting means are also capable of piloting, in slave mode, the modes of operation in conformity with the instructions contained in the external demands originating from a system of the vehicle.

So, for example, when the rotary electrical machine operates in alternator mode, the micro-hybrid system can remain slaved and be piloted from the outside, or else receive, from a control system of the vehicle or of the thermal engine, an estimator of the efficiency of the thermal engine so as to load the thermal engine selectively in the zones where the mechanical fuel-energy conversion is highly efficient, regardless of the destination of the mechanical energy (electricity, air conditioning system) drawn from the thermal engine.

According to yet another characteristic, the piloting means comprise monitoring means which determine a situation of the vehicle and authorize and define, at least partially, at least one of the operating modes of the micro-hybrid system, taking account of their determination of the situation of the vehicle and/or of external demands originating from a system of the vehicle. Preferably, the monitoring means comprise means of estimating a situation of the vehicle among at least one of the following situations: the vehicle is in an urban environment, the vehicle is on a highway, the vehicle is on a motorway.

According to other characteristics, the monitoring means comprise:

means for authorizing and selecting an operating mode as alternator of the rotary electrical machine from among several available operating modes as alternator while taking into account at least the situation of the vehicle; and/or means for authorizing and defining an operating mode of regenerative braking of the rotary electrical machine; and/or means of authorizing and defining an operating mode of torque assist of the rotary electrical machine.

According to another characteristic, the piloting means comprise safety means which define at least one operating limit of the micro-hybrid system on the basis of an internal representation of at least one part of the operating elements of the micro-hybrid system and/or of an external demand originating from a system of the vehicle.

Preferably, said at least one operating limit is comprised within the following operating limits of the micro-hybrid system: the minimum and maximum values of the operating range of a fluctuating voltage component of the micro-hybrid system, calibration/diagnostic, protection and safety values of the fluctuating voltage component, a maximum value for an exciting current of a rotor of the rotary electrical machine and a maximum value of a mechanical torque drawn in a regenerative braking mode of the rotary electrical machine.

Moreover, said internal representation preferably covers at least the following operating elements: the rotary electrical machine, the AC-to-DC converter, the DC-to-DC converter and the first and second electrical energy reservoirs.

According to yet another characteristic, the piloting means comprise state machine means authorizing transitions between the operating modes of the micro-hybrid system depending on at least monitoring and safety information produced by the piloting means. Preferably, said monitoring and safety information is supplied respectively by the monitoring means and the safety means.

In one particular embodiment of the micro-hybrid system according to the invention, said operating modes comprise the following modes:
  at least one alternator mode,
  at least one regenerative braking mode, and
  at least one torque assist mode.

According to another characteristic, said operating modes include at least one of the five following alternator modes:
  an alternator mode in which a fluctuating voltage component is fixed at a determined value indicated by a set value;
  an alternator mode in which the fluctuating voltage component is fixed at an optimal value;
  an alternator mode in which the set value passes to a minimum value when the fluctuating voltage component measured attains a maximum value;
  an alternator mode in which no set value is fixed between the minimum and maximum values of the fluctuating voltage component; and
  a mixed alternator mode comprising at least two of the above modes over the different operating speed ranges of the rotary electrical machine.

According to yet another characteristic, said operating modes comprise at least one of the following three torque assist modes:
  a torque assist mode intervening following the pressing of an accelerator pedal of the vehicle;
  a torque assist mode intervening when the engine is at idle speed;
  a torque assist mode intervening when there is a change of ratio in a gearbox of the vehicle; and
  a torque assist mode designed to consume stored electrical energy available in at least one of the electrical energy reservoirs.

According to yet another characteristic, one of the first and second electrical energy reservoirs comprises at least one supercapacitor.

According to yet another characteristic, the electrical energy reservoir comprising a supercapacitor supply an on-board network under a DC voltage containing a fluctuating voltage component, and the other electrical energy reservoir powers another on-board network under a substantially stable DC voltage.

According to yet another characteristic, the piloting strategies module comprises means of supplying information to a system of the vehicle about the external equipment to be piloted depending on the information provided to the piloting strategies module regarding the situation/state of the vehicle.

BRIEF DESCRIPTION OF THE DRAWINGS

Other advantages and characteristics of the present invention will emerge more clearly on reading the description below of several particular embodiments, making reference to the attached drawings, in which:

FIG. 4 shows the operating zones of the micro-hybrid system corresponding to the cyclical ratios representing the consumption of the electrical systems;

FIG. 5 shows graphs giving a torque value to be drawn for the regenerative braking functions;

FIGS. 6 and 7 are graphs giving the torque values to be applied for torque assist functions;

DETAILED DESCRIPTION OF THE INVENTION

Figure 1:
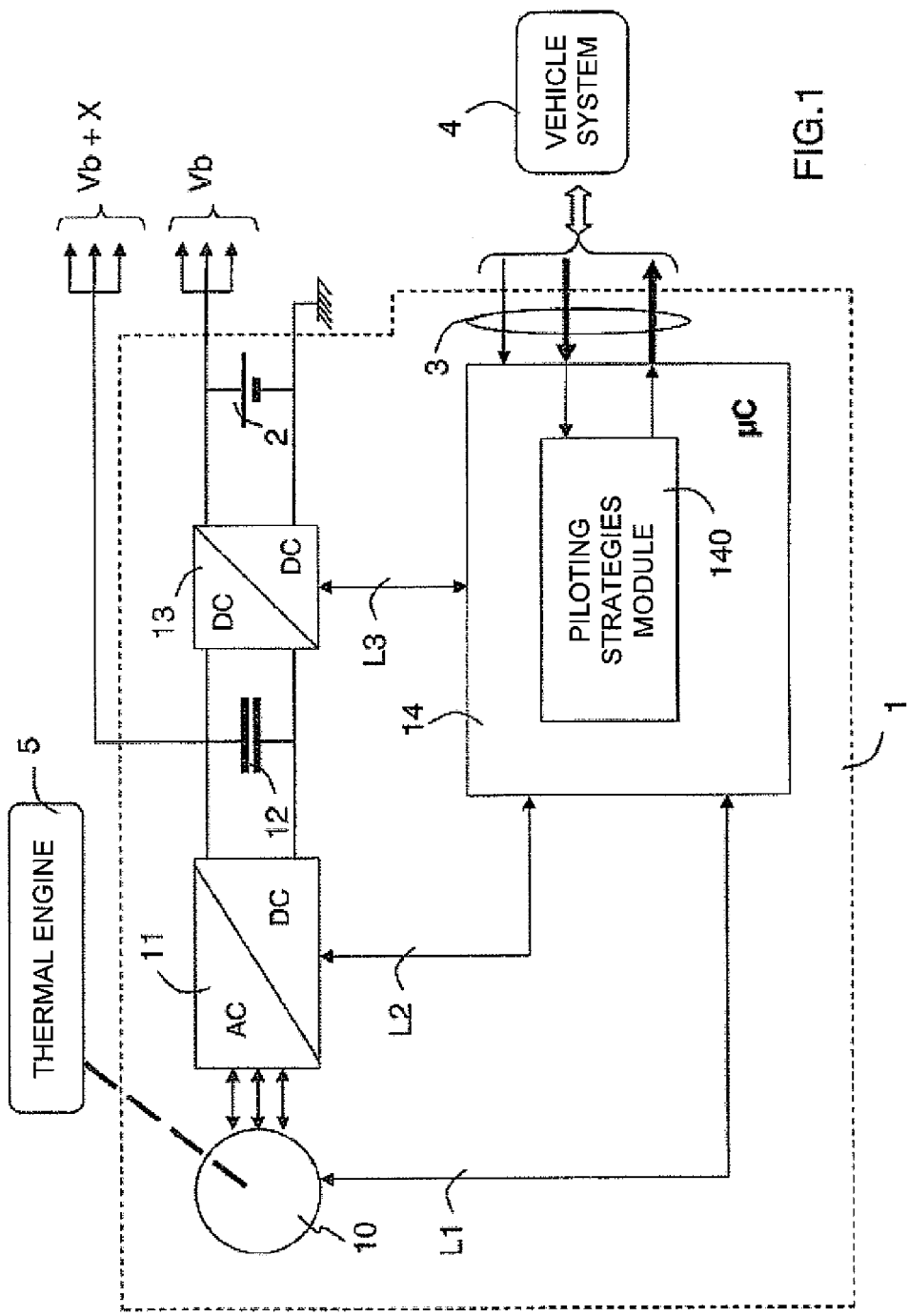
FIG. 1 is a general block diagram showing a general configuration of a particular embodiment of the micro-hybrid system according to the invention.

In more particular reference to FIG. 1, there now follows a general description of the physical and functional configuration of one particular embodiment 1 of a micro-hybrid system according to the invention.

As shown in FIG. 1, in this particular embodiment, the micro-hybrid system 1 according to the invention consists essentially of a rotary electrical machine 10, a reversible AC-to-DC converter 11, an electrical energy reservoir 12, a DC-to-DC voltage converter 13 and a microcontroller 14.

The micro-hybrid system 1 is connected to a dual-voltage on-board network of the vehicle capable of supplying a low DC voltage Vb and a variable high DC voltage Vb+X.

The low DC voltage Vb is generally the 12V voltage of a lead battery 2 fitted to the vehicle. Preferably, the voltage Vb may be used to power the consumer devices of the vehicle which require a relatively stable voltage value, such as the lighting and signalling devices.

In this particular embodiment, the DC voltage Vb+X varies, for example between 12V and 60V, and is available at the terminals of the electrical energy reservoirs 12 whose voltage load is dependent on the operation of the rotary electrical machine 10 in regenerative braking mode.

The voltage Vb+X can be used primarily to supply the consumer devices which accept a variable voltage, such as for example a de-icing device. However, in certain applications, the voltage Vb+X may also be used to supply, through a dedicated DC-to-DC converter (not shown), a consumer device requiring a stable DC voltage, for example a car radio requiring power of under 12V. Moreover, the Vb+X voltage can, in certain applications, also be used to supply the rotary electrical machine 10, operating in starter or motor mode, with a voltage of over 12V.

As shown in FIG. 1, the rotary electrical machine 10 is mechanically coupled, linkage 101, to a thermal engine 5 of the vehicle. The machine 10 is a machine of the alternator-starter type, in this case of the three-phase type, and can operate equally in regenerative braking mode and in torque assist mode. In torque assist mode, the machine 10 delivers additional mechanical torque for vehicle traction to supplement that supplied by the thermal engine 5.

The AC-to-DC converter 11 is a reversible device and, when the rotary electrical machine 10 has to operate in motor mode, enables the machine 10 to be supplied with three-phase alternating voltages obtained from a DC voltage at the terminals of the electrical energy reservoirs 12, and, when the rotary electrical machine 10 has to operate in alternator mode, a rectification in the form of a rectified DC voltage from the three-phase voltages delivered by the machine 10. This rectified DC voltage charges the electrical energy reservoirs 12 and, via the DC-to-DC converter 13, the battery 2.

The electrical energy reservoir 12 in this case is a pack of ultra high capacity capacitors. These capacitors are usually known as "ucap" or "supercapacitors" by persons skilled in the art. The reservoir 12 is referred to simply as supercapacitor 12 in the rest of the description. The supercapacitor 12 enables, by charging itself from the DC voltage delivered by the AC-to-DC converter 11, the storage of electrical energy when the rotary electrical machine 10 operates in regenerative braking mode or in alternator mode. The energy stored in the supercapacitor 12 can be returned to the Vb+X voltage network in order to supply different consumer devices and, in certain cases, to the Vb voltage network, via the DC-to-DC converter 13, for example when the machine 10 is not supplying power and the battery 2 is incapable of responding to a peak current demand on the Vb voltage network. Moreover, the energy stored in the supercapacitor, as already indicated above, can be used to start the thermal engine 5 or to provide it with torque assist under a Vb+X voltage which can be significantly greater than the classic 12V, thus facilitating the supply by the rotary machine 10 of the high mechanical torque required in the case of large thermal engines.

The DC-to-DC converter 13 is a reversible device and enables, firstly, a transfer of energy to the Vb voltage network to supply the consumer devices and to charge the battery 2 and, secondly, a transfer of energy in the opposite direction from the 12V voltage of the battery 2 to charge the supercapacitor 12 if necessary and to supply the AC-to-DC converter 11 when the rotary machine 10 operates as motor/starter.

The micro-controller 14 controls the operation of the micro-hybrid system 1 on the basis of information representing the internal state of the micro-hybrid system 1 and the state of the vehicle. A piloting strategies module 140, described in detail further on in the description, is implemented in the micro-controller 14 so as to pilot the micro-hybrid system 1 by taking account of the internal state thereof and of the state of the vehicle. State and command information can thus be exchanged between the micro-controller 14 and different functional elements of the micro-hybrid system 1 via signal exchange links. Some signal exchange links L1, L2 and L3 between the micro-controller 14 and the elements 10, 11 and 13 are shown by way of example in FIG. 1.

As also shown in FIG. 1, a data communication bus 3, for example of the CAN type, is also provided for the exchanges of information between the micro-hybrid system 1 and the system 4 of the vehicle. Information such as a pressing of the brake pedal or the accelerator pedal can thus be transmitted to the micro-hybrid system 1 by the vehicle system 4 via the data communication bus 3.

In reference to FIGS. 2 to 5, there now follows a detailed description of the piloting strategies module 140 of the micro-hybrid system 1 according to the invention.

In accordance with the invention, the piloting strategies module 140 pilots the rotary electrical machine 10 in alternator mode depending on the respective consumptions of the on-board Vb+X and Vb networks and of the situation of the vehicle, for example, whether the vehicle is driving in an urban area or on a highway.

In this particular embodiment of the invention, the following hypotheses have been adopted:

1—If one or more loads on the Vb+X side requires a particular voltage in order to operate, it is assumed that this voltage value is imposed by an external demand of the vehicle system 4 on the piloting strategies module 140 and it is given priority treatment.

2—The piloting strategies module 140 has access to sufficient relevant data to have a reliable internal model of the vehicle. Otherwise, it will be assumed that the operating modes will be imposed by an external demand or that there is a fault mode.

3—The command variables, i.e. the cyclical ratios of the AC-to-DC converter 11 in inverter mode and of the DC-to-DC converter 13, are representative of the consumption of the Vb and Vb+X on-board electrical networks.

4—Maps of the rotary electrical machine 10 are available and provide, for the different values of the fluctuating voltage component X of the Vb+X voltage:

the mechanical torque taken from the shaft of the thermal engine 5: $C1_{meca}=CREGEN(X, \delta_1\%, N_{machine})$;

the mechanical torque supplied to the shaft of the thermal engine 5: $C2_{meca}=CBOOST(X, \delta_1\%, N_{machine})$;

the current output on the Vb+X network: $Ix=CDEBIT(X, \delta_1\%, N_{machine})$, the corresponding exciting current: $I_{ex}=PWM(X, \delta_1\%)$;

Where CREGEN and CBOOST correspond respectively to the maps for the function of regenerative braking referred to as REGEN and the torque assist function referred to as BOOST. In general, the functions of regenerative braking and of torque assist are referred to as REGEN and BOOST in the rest of the description.

Where CDEBIT and PWM correspond respectively to the maps for the current output Ix from the machine 10 in alternator mode and for the exciting current $I_{ex}$ to be supplied to the rotor of the machine 10 in pulse width modulated form (PWM) in this particular embodiment.

Where $\delta_1\%$ represents the cyclical ratio of the exciting current $I_{ex}$ flowing through the rotor of the machine 10.

Similarly, it will be noted for the rest of the description that $\delta_2\%$ is the cyclical ratio of the DC-to-DC converter 13 between the Vb+X voltages and the Vb voltage.

Figure 2:
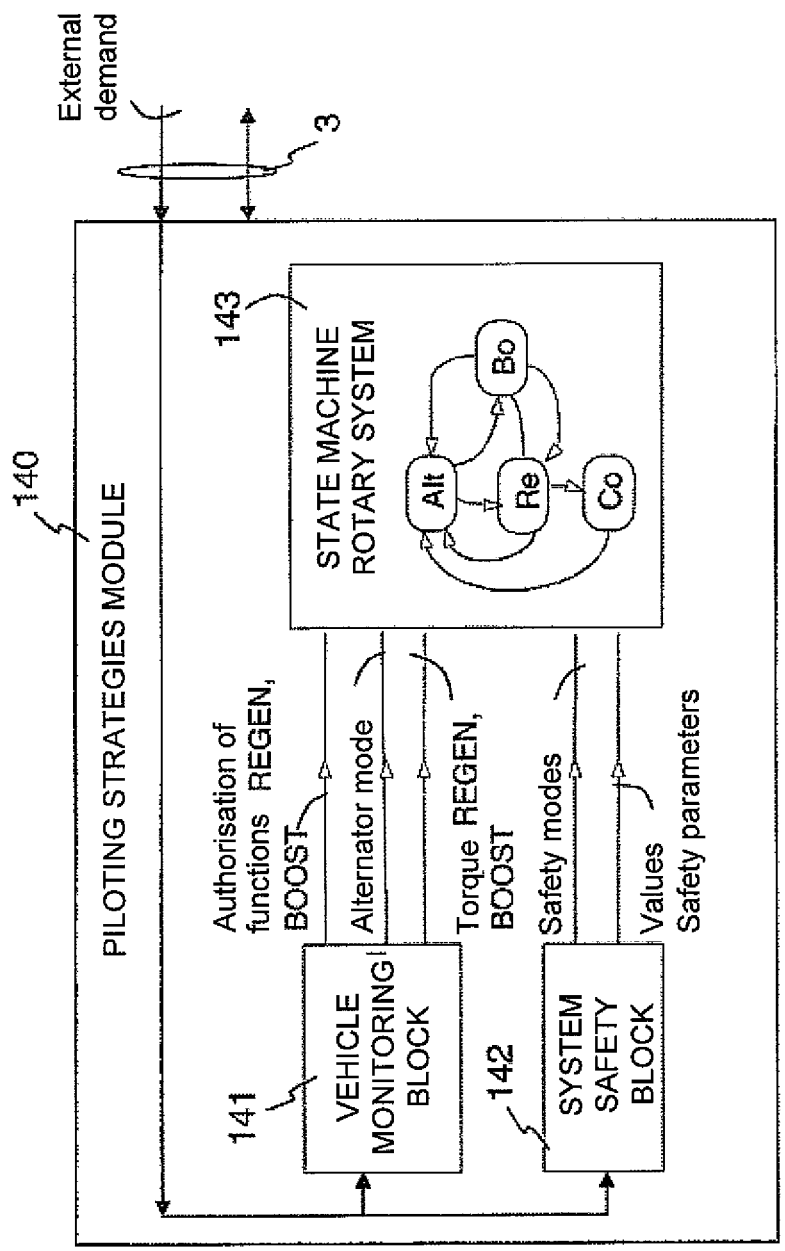
FIG. 2 is a functional block diagram of a piloting strategies module included in a control unit of the micro-hybrid system in FIG. 1.
Figure 3:
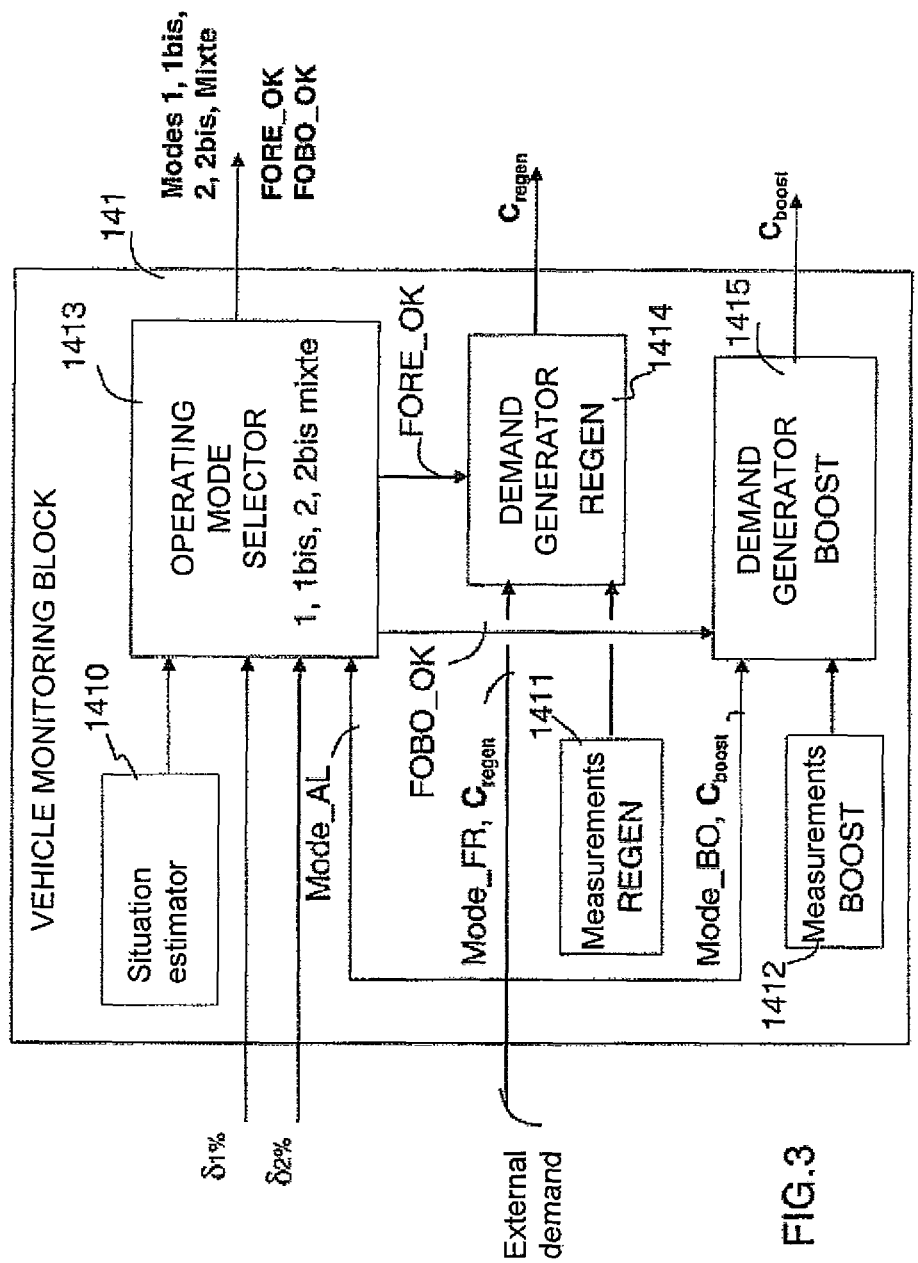
FIG. 3 is a functional block diagram of a vehicle monitoring block included in the piloting strategies module in FIG. 2.

As shown in FIG. 2, the piloting strategies module 140 comprises in particular two blocks 141 and 142 which are responsible for establishing parameters utilized in the decision-making modules included in the module and a block 143 which is a state machine block of the rotary system (rotary electrical machine 10).

The block 141, designated VEHICLE MONITORING, determines the environment of the vehicle and defines the utilization of alternator modes designated mode 1, mode 1a, mode 2, mode 2a of the machine 10. Obviously, the invention is not limited to the above four alternator modes and, depending on the applications, may include other modes, lesser in number, or, according to the invention, any combination of the alternator modes described below is possible. The block 141 is also responsible for generating the demands of internal origin for regenerative braking depending on information provided to the block 141 regarding the vehicle or of external origin for a slave mode piloted by the vehicle's system 4. The block 141 is also capable of generating external demands for particular operating points.

The block 142, designated as SYSTEM SAFETY MONITORING, defines the operating limits of the system. To do so, it works from an internal representation of each sub-system or from an external demand.

Vehicle Monitoring Block 141

In reference more particularly to FIGS. 3 to 7, the VEHICLE MONITORING block 141 is now described in detail.

The block 141 essentially consists of functional sub-blocks 1410, 1411, 1412, 1413, 1414 and 1415.

There is also provision in the block 141 of a sub-block (not shown) for the management of external demands which are transmitted to sub-blocks 1413, 1414 and 1415.

The external demands include, but are not limited to: a demand for a particular alternator mode, a demand for regenerative braking and a demand for torque assist.

The piloting strategies module 140 thus authorizes autonomous modes for which it itself determines the operating modes and the slave modes for which the vehicle system 4 decides itself which parameters to apply.

Outputs of the block 141

Operating modes:
    Mode 1: continuous alternator mode at a fixed voltage
    Mode 1a: continuous alternator mode at the optimal voltage
    Mode 2: alternator mode alternating between two values $X_{min}$ and $X_{max}$ of the fluctuating voltage component X of the voltage Vb+X
    Mode 2a: alternator mode varied by actions on the functions REGEN and BOOST
    Mixed mode: authorization of modes 1, 1a, 2, 2a over certain ranges of engine speeds Authorization flags:
    FORE_OK: regenerative braking mode authorized or not
    FOBO_OK: boost mode authorized or not Set value of torque:
    $C_{regen}$: instantaneous REGEN torque
    $C_{boost}$: instantaneous BOOST torque Inputs of the block 141
    $\delta_1\%$ represents the cyclical ratio of the exciting current $I_{ex}$ of the rotor, which, for a given value of the fluctuating voltage component X, represents the consumption of the Vb+X network.
    $\delta_2\%$ represents the "cyclical ratio" of the DC-to-DC converter 13, which, for given values of the fluctuating voltage component X and of voltage and Vb, represents the consumption of the Vb network.
    External demand of the vehicle system 4:
        Mode_FR: Regenerative braking mode
            Mode_FR=0: autonomous mode
            Mode_FR=1: slave mode
        Mode_BO: Operating mode in torque assist (boost)
            Mode_BO=0: autonomous mode
            Mode_BO=1: slave mode
        Mode_AL: Alternator operating mode
            Mode_AL=0: autonomous mode
            Mode_AL=1: slave mode
        Torque command $C_{regen}$
        Torque command $C_{boost}$
        Parameters of the imposed alternator mode (ALTER)

Sub-Block 1410: Estimator of Vehicle Situation

The duty of the sub-block 1410 is to determine whether the vehicle is in town, on a highway or on a motorway. Different detection strategies can be used and must be selected by the person skilled in the art depending on the applications. In full slave mode, this block 1410 gives the control system of the vehicle the option of piloting "high-level" strategies.

Sub-block 1411: Measurements in REGEN mode

The duty of this sub-block 1411 is to centralize all the measurements considered useful to generate correctly a REGEN demand. This includes, inter alia:

the speed of rotation of the crankshaft of the thermal engine 5 (which can be estimated by the speed of the machine 10)

the ratio engaged by the gearbox of the vehicle the clutch status of the vehicle (either by the gearbox, or by the clutch pedal)

the position of the accelerator pedal of the vehicle (for the detection of an engine brake)

the position of the brake pedal of the vehicle (for the detection of a mechanical brake)

the linear velocity of the vehicle the information "injection cut-off", if available in the vehicle.

Sub-Block 1413: Operating Mode Selector

This sub-block 1413 relies on the town, road, or motorway information and the electrical consumption or external demand when it comes to imposing alternator operating mode. In this particular embodiment, 4 modes of alternator operation are available, i.e. 2 permanent modes and 2 variable modes. To these 4 modes can be added a mixed mode alternating between the alternator modes 1x and 2x, according to a criterion which is a function of the range of speed of the machine. These modes are described more precisely in the rest of the description.

In autonomous operating mode, the system selects the "best" alternator mode according to the situation of the vehicle and its electrical consumption as represented by the control variables $\delta_1\%$ and $\delta_2\%$, respectively for the AC-to-DC converter 11 in inverter mode and the DC-to-DC converter 13. In other embodiments, it is possible to take only consumption values into account.

The slave alternator mode (Mode_AL=1) imposes an alternator mode defined by the parameters ALTER.

As shown in FIG. 4, in diagram form, it is possible to define several zones (A, B and C) corresponding to different levels of consumption. It will be noted that the number of zones and the form of the divisions shown in FIG. 4 are not limitative. In this figure, $\delta_{1max}$ is a function of the temperature of the machine 10 and of its electronics and $\delta_{2max}$ is a function of the temperature of the DC-to-DC converter 13. Moreover, the zones may call on parameters other than the respective consumption of the networks, such as the speed of the thermal engine 5 or the mechanical power already taken from the shaft of the thermal engine 5.

Depending on the environment detected, certain functions can be prevented and a operating mode imposed. For example, in town, it is possible to define:

| Zone | REGEN function | BOOST function | Mode |
| --- | --- | --- | --- |
| A | FORE_OK = false | FOBO_OK = false | Mode 1a |
| B | FORE_OK = true | FOBO_OK = true | Mode 1 |
| C | FORE_OK = true | FOBO_OK = false | Mode 1a |

For example, it is possible to define, on a highway and motorway:

| Zone | REGEN function | BOOST function | Mode |
|---|---|---|---|
| A | FORE_OK = true | FOBO_OK = true | Mode 1a or 2a |
| B | FORE_OK = true | FOBO_OK = true | Mode 2 |
| C | FORE_OK = true | FOBO_OK = false | Mode 1a |

This is essentially out of thermal considerations for the supercapacitors, for which it is assumed that cooling is easier on a highway and on the motorway.

The tables above are examples, which are of course not in any way limitative, as the solutions used, the number of zones and the forms of these zones depend to a great extent on the configurations of the vehicles. Thus, in certain embodiments, a variable alternator mode (2 or 2a) may also be provided in town, in certain zones.

Sub-Block 1414: Generator of the REGEN Demand

The duty of this block 1414 is to generate REGEN demands.

For all the electrical functions (REGEN and BOOST), the module 140 notifies the system of the vehicle or of the thermal engine 5 of the torque which it is taking from or supplying to the shaft of the thermal engine 5 so that the latter can adapt its behavior accordingly.

The REGEN function is expressed, depending on the embodiments, as torque to be taken from the shaft of the thermal engine 5 or as recuperated electrical power. In the rest of the description, it will be assumed that the value supplied as parameter is that of torque to be taken from the shaft of the thermal engine 5. Preferably, the value of the parameter "torque to be taken" may be updated by the giver of external order as many times as necessary, until the mission is completed.

If the sub-block 1411 fails, a downgraded slave mode can be imposed immediately if the system does not exhibit any component failure.

The sub-block 1414 has a maximum value of the torque which can be taken, called $C_{max\_dispo}$. This maximum torque corresponds to the maximum value of the torque which the machine 10 is capable of taking from the shaft of the thermal engine 5. Hence, it corresponds to the maximum output graphs of the machine 10 operating in alternator mode for different values of the fluctuating voltage component X.

External Demands

Typically, in this embodiment, the behavior of the sub-block 1414 is as follows:

Autonomous mode (Mode_FR=0):

$C_{regen}=0$=>management by the system $C_{regen}>0$=>priority given to external demand over the value calculated by module 140.

Slave mode (Mode_FR=1):

$C_{regen}=0$=>no regenerative braking $C_{regen}>0$=>normal situation

Internal Demands

At any moment and even in autonomous mode, an external order giver can demand a REGEN phase, which will override the internal calculation.

The internal calculation provides a result which is a percentage of the torque ($C_{max\_dispo}$).

REGEN1

The following logic conditions authorize the mode REGEN1:

brake pedal not actuated (or position below a certain threshold)

AND (accelerator pedal not actuated OR negative speed of the pedal below a certain negative threshold)

AND clutch closed

AND gearbox ratio >1

AND engine speed>parametrable threshold.

REGEN2

The following logic conditions authorize the mode REGEN2:

accelerator pedal>parametrable threshold

AND (clutch open or gearbox ratio in neutral)

AND (engine speed>parametrable threshold or engine speed stabilized for a certain period).

It will be noted that the mode REGEN2 can be useful to recharge the supercapacitors at a high stabilized engine speed, for example above 4,000 rpm. This mode can easily be deactivated by setting unattainable thresholds. This mode is a particular alternator mode; it is not, strictly speaking, a regenerative braking mode.

Furthermore, it will be noted that other conditions may be used to track other useful phases. For example, to limit any excessive torque take-offs during the definition of a REGEN mode on the basis of the accelerations detected. It will also be noted that after the first start, the fluctuating voltage component X is defined as $X_{min}$ while waiting to be able to use the sophisticated energy management functions.

In this particular embodiment, the REGEN mode is an OR logic combination of all the sub-modes: REGEN_OK=REGEN1 OR REGEN2.

In general, as shown by the graphs in FIG. 5, if the conditions for application of the REGEN mode are met, the percentage of the maximum torque to apply essentially depends on the speed of the engine, but also on the linear velocity of the vehicle. The regenerative braking torque to apply is given by: $C_{regen}=\text{Torque\_ratio}*C_{max\_dispo}$.

The torque limitation is intended to make the regenerative braking mode transparent when the engine speed becomes too low and there is an increased risk of stalling the engine.

Sub-Block 1412: Boost Measurements

In the same way as sub-block 1411 defines the measurements necessary to create the REGEN orders, the duty of this sub-block 1412 is to centralize all the measurements seen as useful for correct generation of a BOOST demand for torque assist. This includes, inter alia:

the speed of rotation of the crankshaft (which can be estimated by the speed of the machine 10)

the gearbox ratio engaged the status of the clutch (either via the gearbox, or by the clutch pedal)

the position of the accelerator pedal (to detect a demand for acceleration)

the position of the brake pedal (to secure this actuator mode)

the linear velocity of the vehicle the message "injection cut-out" if available (to secure this actuator mode).

The measures are almost symmetrical to those used for the REGEN function.

Sub-Block 1415: Generator of Boost Demand

In general, there are several operational phases of the vehicle in which a BOOST assist from electrical torque can be useful. The three most typical cases are as follows:

1—When the driver presses on the accelerator pedal in order to increase the linear velocity of his vehicle without changing gears. Depending on the value of the electrical torque supplied, the electrical boost (or absence of boost) may be detected by the driver.

2—Idle speed boost: if there is sufficient energy available and if there are relatively few consumer devices, it is possible to boost the thermal engine 5 so that it reduces its set value for idle speed and/or the quantity of fuel injected.

3—Boost when changing gear: this is an approval function which can be activated when the driver changes to a higher gear: when the clutch is engaged, the resisting torque linked to the vehicle (wheel torque, vehicle speed, etc.) brakes the engine. A drop in speed may then occur which can be limited with the aid of this operating mode.

In addition to the three cases above, there is also an electrical consumption mode (BOOST_CONS) to reduce the quantity of energy stored in the supercapacitor. In accordance with this mode, at a stabilized engine speed and with a progressive transition over a sufficiently long time, it is possible to apply a positive torque, the amplitude of which depends on various conditions and which must not be detectable by the driver.

With respect to the sub-block 1415, which is a BOOST demand generator, this sub-block is responsible for generating the demands for BOOST. There are several situations which may require the machine 10 to operate in engine mode. A distinction is made between the internal situations of electrical consumption in order to reduce the quantity of electricity stored (a fairly rare situation) and the situations where the thermal engine 5 is assisted by providing it with a mechanical torque, either to aid acceleration or to enable it to reduce the amounts of fuel injected (this latter case presumes that the control of the thermal engine 5 is highly accurate with respect to transient engine operating conditions).

For all electrical functions (REGEN and BOOST), the module 140 notifies the control system of the vehicle or that of the thermal engine 5 of the torque which it is taking from or supplying to the shaft of the thermal engine 5 so that the latter can adapt its behavior.

The BOOST function will be expressed, depending on the applications of the invention, as torque to be supplied to the shaft of the thermal engine 5, as mechanical power to be provided or as a percentage of the maximum available torque. In the rest of the description, it will be assumed otherwise that the value provided as parameter is a torque to be supplied to the shaft of the thermal engine 5.

Depending on the embodiments, the value of the torque to be supplied can be updated by the giver of external order each time this is necessary until the mission is complete.

If the sub-block 1412 should fail, a downgraded slave mode can be imposed immediately if the system does not exhibit any component failure.

The sub-block 1415 has a maximum value of torque which it can supply, referred to as $C_{max\_dispo}$. This maximum torque corresponds to the maximum value of the torque which the machine is capable of supplying to the shaft of the thermal engine 5. Hence it corresponds to the graphs showing maximum torque of the machine 10 operating in motor mode for different values of the fluctuating voltage component X.

External Demands

Typically, in this embodiment, the behavior of the sub-block 1415 is as follows:

Autonomous mode (Mode_BO=0):

$C_{boost}=0$=>management of torque assists (BOOST) by the system $C_{boost}>0$=>priority given to external demand over the value calculated by the system Slave mode (Mode_BO=1):

$C_{boost}=0$=>no torque assist (BOOST)

$C_{boost}>0$=>normal situation

Internal Demands

At any moment and even in autonomous mode, an external order giver can demand a BOOST assist phase which will override the internal calculation. The internal calculation gives, as result, a percentage of the torque $C_{max\_dispo}$ to apply.

BOOST1

The following logic conditions authorize the mode BOOST1:

brake pedal not activated (or position below a certain threshold)

AND accelerator pedal<certain threshold

AND speed of pressure on accelerator pedal>certain threshold

AND clutch closed

AND gear ratio $\geq 1$

AND linear velocity of the vehicle<parametrable threshold.

It will be noted that this particular mode makes it possible to deliver torque when acceleration is demanded.

In this case, the percentage of the maximum torque available to be supplied obeys a pre-determined law, such as that shown by way of example in FIG. 6.

BOOST2

The following logic conditions authorize the mode BOOST2:

accelerator pedal not activated (or below a certain threshold)

AND (clutch fully open or gearbox in neutral)

AND idle speed stabilized for a certain period.

It will be noted that the system 1 can intervene to provide torque assist when idling in order to allow a reduction in the quantities of fuel to be injected. For this mode to remain transparent to the driver, it is preferable for the system of the vehicle to be informed of the torque supplied by the system 1 or for the torque assist for idling to be applied with a regulation loop at least 10 times slower than the management of the thermal torque.

In this case, the percentage of the maximum torque available to be supplied depends on the level of consumption and obeys a predetermined law such as that shown by way of example in the FIG. 7.

BOOST_CONS1

The following logic conditions authorize the mode BOOST_CONS1:

Brake pedal not activated (or position below a certain threshold)

AND accelerator pedal activated>certain threshold

AND clutch closed

AND gearbox ratio $\geq 2$

AND linear velocity of the vehicle>certain threshold.

It will be noted that this particular mode enables a reduction in the voltage of the Vb+X network when the vehicle is driven above a certain speed. This mode must not be detectable, hence the torque which will be applied is a limited torque. According to the invention, there are several possible approaches to determine this torque.

For example, the torque applied can be constant and dependent on system parameters or can be variable according to other considerations, for example the speed of the thermal engine 5:

$$\text{Torque\_value} = \frac{N_{noload}(p) - N_{mes}}{N_{noload}(p) - N_{idle}}$$

where $N_{noload}(p)$ is the stabilised speed of the thermal engine 5 corresponding to the position p of the accelerator pedal when the thermal engine 5 is at no load.

Torque Applied Cboost

The mode CONS pilots the authorization of the BOOST_CONS1 in the logic equation below. The percentage applied depends on the consumption mode authorized, but the torque assist authorization is given by the flag:

BOOST_OK=BOOST1 OR BOOST2 OR [BOOST_CONS1 AND CONS]

And the torque applied is:

$C_{boost}$=Torque_ratio*$C_{max\_dispo}$

System Safety Block 142

Figure 8:
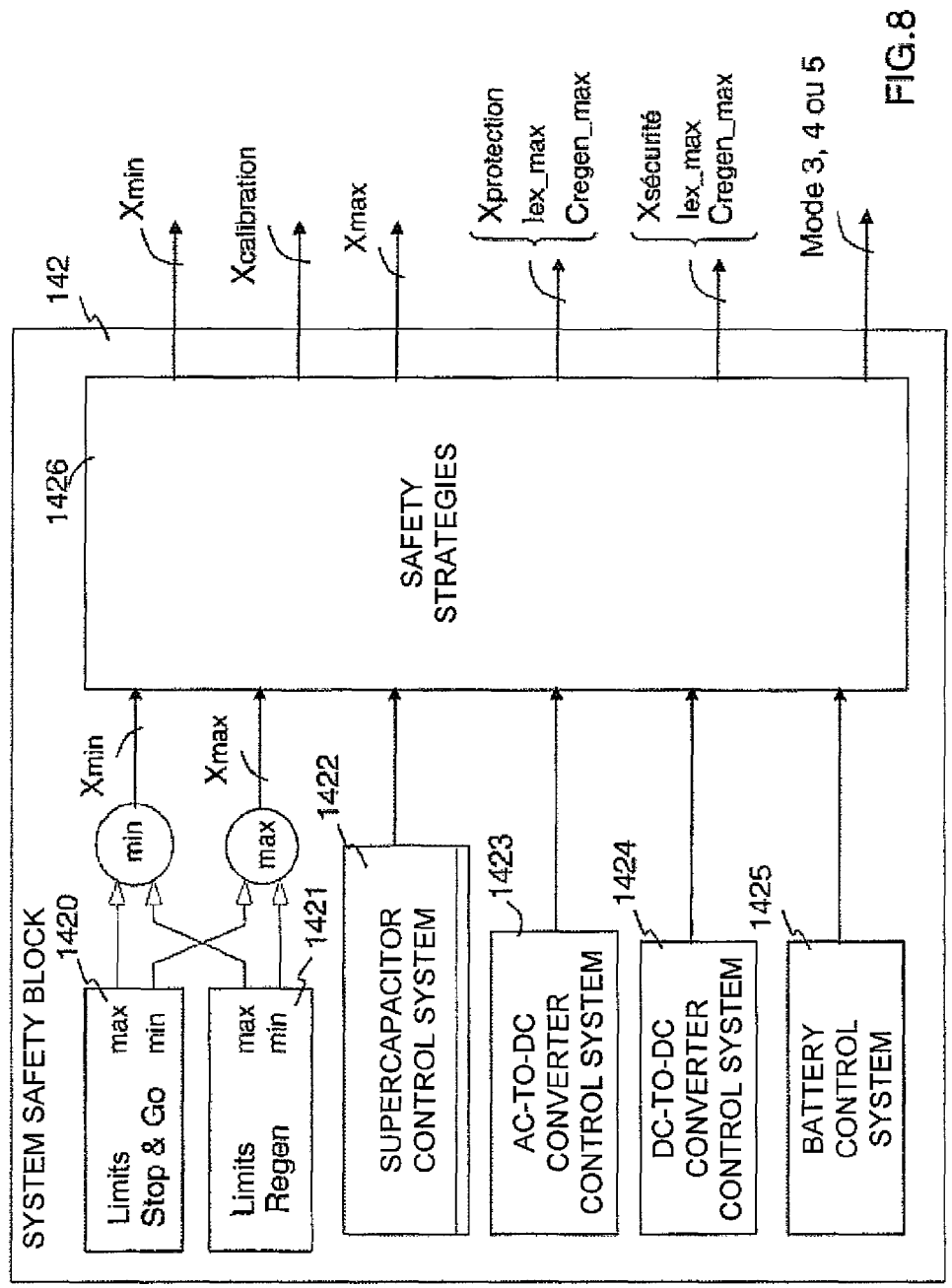
FIG. 8 is a functional block diagram of a system safety module included in the piloting strategies module in FIG. 2.
Figure 9:
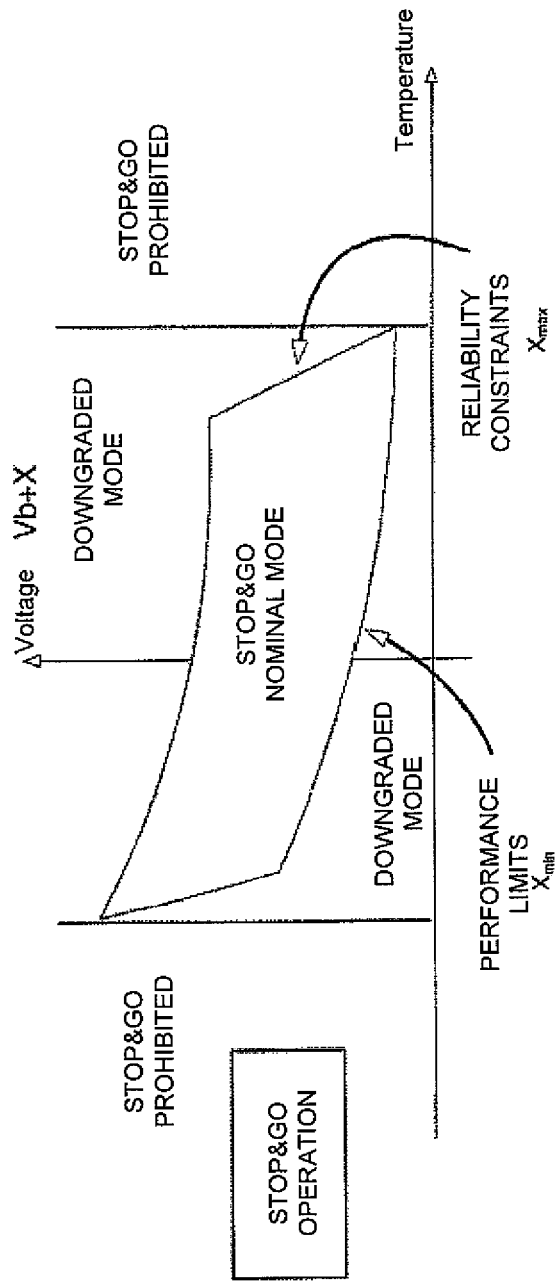
FIG. 9 is a graph showing limitations of a fluctuating DC voltage to be imposed on an on-board voltage network of the vehicle depending on the temperature of the system and in an application in question.
Figure 10:
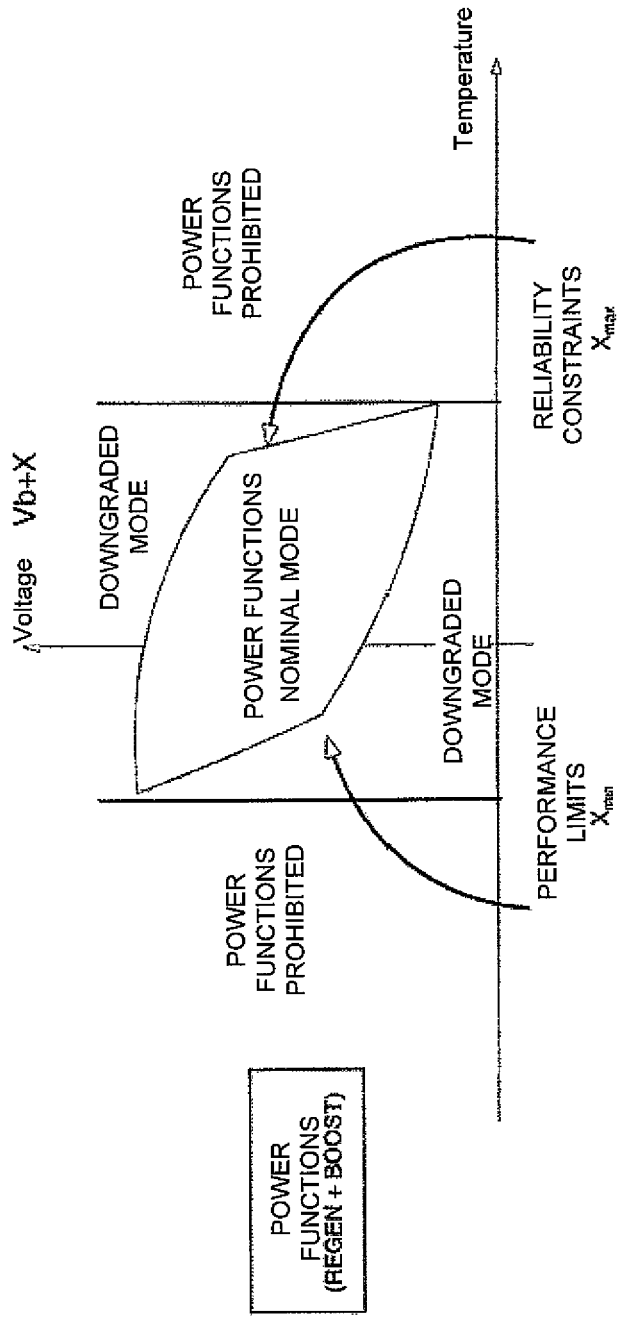
FIG. 10 is a graph showing the maximum limits of use for the functions of regenerative braking and torque assist depending on the temperature of the system and in an application in question.

In reference more particularly to FIGS. 8 to 10, the SYSTEM SAFETY block 142 is now described in detail.

This block 142 allows operational limits to be imposed on the voltage of the Vb+X network depending on the internal state of the micro-hybrid system 1.

All the known functions which can be available in alternator-starter systems can be affected by this functional block 142, i.e.: the function STOP&GO, the functions ALTERNATOR, REGEN, BOOST, and the function DC-to-DC converter. It should be remembered at this point that the Stop & Go function, as it is referred to in the rest of the description, turns off the thermal engine 5 under certain conditions and then restarts it automatically, for example when the accelerator pedal is pressed, or a gear is engaged.

Outputs of the Block 142
  Minimum value of the range of operation: $X_{min}$
  Voltage value for calibrations/diagnostics: $X_{calibration}$
  Maximum value of the range of operation: $X_{max}$
  Protection values: $X_{protection}$, $I_{ex\_max}$, $C_{regen\_max}$
  Safety values: $X_{safety}$, $I_{ex\_max}$, $C_{regen\_max}$
  Mode 3=protection (Boolean logic)
  Mode 4=safety (Boolean logic)
  Mode 5=calibration/diagnostic (Boolean logic)

Sub-Block 1420: STOP/GO Limits

This sub-block 1420 translates the limitations of the voltage to be imposed on the network depending on the temperature of the system and in the application concerned. Please refer to FIG. 9. In diagram form, without this being restrictive as to the scope of the invention, a lower limit corresponds to the minimum nominal operating voltage (for example, to be capable of realising a certain test, such as driving the thermal engine twice for 1 second). An upper limit usually corresponds to a limit of reliability, for example, on the maximum current permitted by the AC-to-DC converter 11.

Sub-Block 1421: REGEN Limits

Similarly to sub-block 1421, this sub-block 1421 translates the maximum limits of use for the functions REGEN and BOOST depending on the temperature of the system and in the application concerned. Please refer to FIG. 10. In diagram form, without this being restrictive, a lower limit corresponds to the minimum nominal operating voltage in BOOST mode (for example, to be capable of realising a certain test such as driving the thermal engine in BOOST mode for 1 second then a restart test of 1 second). The upper limit usually corresponds to a limit of reliability linked to the REGEN function.

Sub-Block 1422: SUPERCAPACITOR Control System

The sub-block 1422 is a control system and its task is to define the operational level of the supercapacitor 12. It can impose a calibration/diagnostic mode, and thus impose a particular operational point.

The sub-block 1422 recommends the values of the functional parameters and the states of activation of the functions when the component with which it is concerned is not in working condition.

Sub-Block 1423: MACHINE 10/AC-To-DC CONVERTER 11 Control System

The sub-block 1423 is a control system responsible for defining the operational level of the AC-to-DC converter 11 and of the machine 10. It can impose a calibration/diagnostic mode and thus impose a particular operational point. It recommends the values of the functional parameters and the states of activation of the functions when the component with which it is concerned is not in working condition.

Sub-Block 1424: DC-To-DC Converter 13 Control System

The sub-block 1424 is a control system responsible for defining the functional level of the DC-to-DC converter 13. It can impose a calibration/diagnostic mode and thus impose a particular operational point. It recommends the values of the functional parameters and the states of activation of the functions when the component with which it is concerned is not in working condition.

Sub-Block 1425: Battery 2 Control System

The sub-block 1425 is a control system responsible for defining the functional level of the battery. It can impose a calibration/diagnostic mode and thus impose a particular operational point. It recommends the values of the functional parameters and the states of activation of the functions when the component with which it is concerned is not in working condition.

Sub-Block 1426: Safety Strategies for Vb+X

The sub-block 1426 relies on the functional states of the sub-assemblies to authorize or inhibit certain functions or their functional levels.

It is assumed at this point that the control systems enable 3 types of modes to be defined:
  mode OK corresponding to a normal functional level of class A
  downgraded mode: corresponding to operating modes from class B and class C
  mode KO: corresponding to operating modes from class D and class E.

By default, the safety and protection modes are not activated (OFF). If there is activation of mode 3, referred to as protection, the set value applied is $X_{protection}$ if there is no external demand. If mode 4, referred to as safety, is activated, the set value applied is $X_{safety}$, even if there is an external demand. The logic equations which give the values for the two corresponding flags can be:

PROTECTION=downgraded mode SUPERCAPACITOR

OR downgraded mode AC-to-DC CONVERTER & MACHINE
OR downgraded mode DC-to-DC converter
OR downgraded mode BATTERY SAFETY=mode KO SUPERCAPACITOR OR mode KO AC-to-DC CONVERTER & MACHINE
OR mode KO DC-to-DC CONVERTER
OR mode KO BATTERY It will be noted that in certain embodiments, the SAFETY mode may in some circumstances be triggered if two or more downgraded modes are declared. Obviously, the above logic equations are given by way of example and are not limitative.
Rotary System State Machine Block 143

Figure 11:
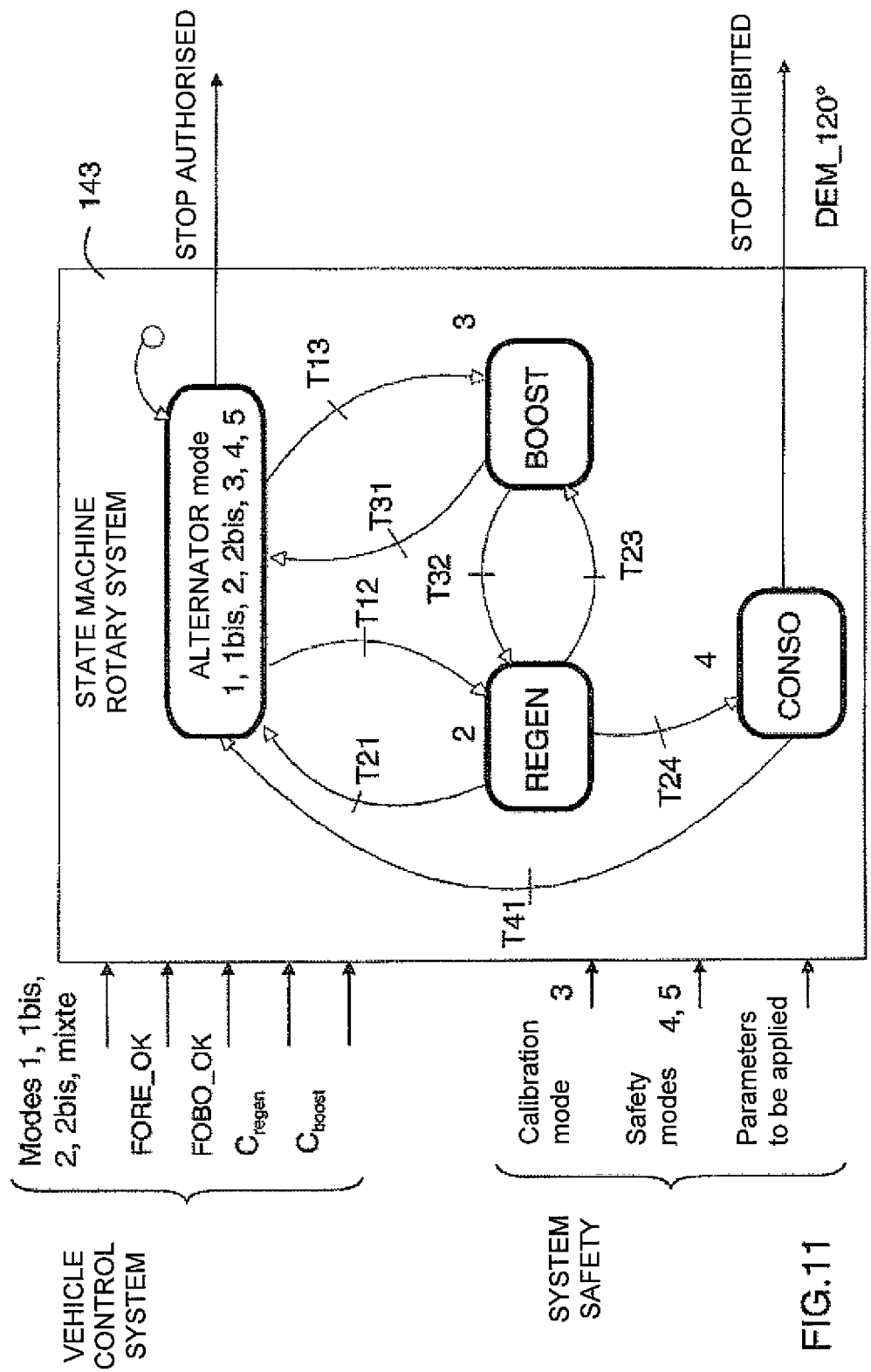
FIG. 11 is a functional block diagram of a rotary system state machine block included in the piloting strategies module in FIG. 2.

Making reference more particularly to FIG. 11, the ROTARY SYSTEM STATE MACHINE BLOCK 143 is now described in detail.

If the operational class is C, D or E, by default the alternator mode is mode 1 or 1a, depending on the strategy adopted. The particular modes 3, 4 and 5 are not described here.

Before the first start and in the system wake-up phase, depending on the measured voltage of the capacities, different flags are initialized:

1—$X_{max\_regen} > X_{mes} > X_{max\_120°}$ (where $X_{max\_regen} > X_{max\_120°}$)
CONS=TRUE
STOP_PROHIBITED=TRUE AND STOP_AUTHORISED=FALSE
START_120°=TRUE (by safety)

2—$X_{max\_120°} > X_{mes} > X_{max}$
CONS=TRUE
STOP_PROHIBITED=FALSE AND STOP_AUTHORISED=TRUE
START_120°=TRUE 3—$X_{mes} < X_{max}$
CONS=FALSE
STOP_PROHIBITED=FALSE AND STOP_AUTHORISED=TRUE
START_120°=FALSE The reference CONS above concerns a particular BOOST mode executed to consume any energy available in the supercapacitor 12. The reference STOP concerns the mode MARCHE/ARRET (usually referred to in English as Stop&Go) described above in the description. The references START and 120° concern a starter mode of the machine 10 in which, in the initial phase of starting the thermal motor 5, the machine 10 is supplied with three-phase voltages whose swings are limited to 120°, in order in particular to limit demand for current in the initial starting phase.

Process 1 "ALTERNATOR ACCORDING TO MODE"

In this mode, regulation occurs according to the mode defined: 1, 1a, 2, 2a or mixed.

After the first start and until the functions STOP&GO are possible, the model 1a or 2a is imposed if there is no priority slave mode.

If the conditions of the vehicle demand a change of alternator mode, the transition is done smoothly by adapting the control parameters according to gradients or other types of trajectory and by imposing, during the transition (if Xcons2 is the calculation of the new set value):

If $X_{cons2} > X_{cons1}$ then (REGEN_OK=TRUE AND BOOST_OK=FALSE) and mode 1
If $X_{cons2} < X_{cons1}$ then (REGEN_OK=FALSE AND BOOST_OK=TRUE) and mode 1.

These conditions are imposed until the conditions of the mode chosen are fulfilled.

If the mode CONS (CONS=TRUE) has been activated, it is necessary to reduce the voltage of the supercapacitor. Different consumption strategies are possible and the means of reducing the fluctuating voltage component X also depend on the phase of use of the vehicle.

As the thermal engine is rotating, the prioritised modes of consumption are:

1—Increase the voltage of the Vb network if there are any consumer devices and without changing the alternator modes.

2—Normal BOOST modes
3—BOOST_CONS mode in order to accelerate consumption.

When the thermal engine is stopped (depending on the strategy chosen):

1—Starting mode 120°
2—Joule dissipation (rotor or stator) if in parking mode for long "enough".

Depending on the suppression strategy, when the voltage goes back below the maximum permitted threshold ($X_{max\_120°}$), the CONS flag returns to the value FALSE, as do the flags STOP_PROHIBITED=FALSE and STOP_AUTHORISED=TRUE. The algorithmic part which manages the STOP&GO function will be determined in relation to the flag START_120°. When the voltage falls into the nominal zone ($X_{mes} < X_{max}$), the flag START_120° returns to FALSE.

It will be noted that in the strategy where the STOP function is suppressed, a situation where the thermal engine is stopped is only possible by an action on the ignition key. However, in slave piloting mode, the control system of the motor control can demand a start by the system 1 if the conditions allow. These "forced" starts are saved to memory, without notifying the driver, for future analysis in maintenance. In the strategy where there is no wish to suppress the STOP function, it is necessary to choose the threshold $X_{max\_regen}$ of the transition T24 (detailed below) below the maximum voltage authorizing starting 120° $X_{max\_120°}$.

Transition T12
Transition T12 corresponds to the passage "ALTERNATOR=>REGEN" and is activated if and only if:
FORE_OK=TRUE
AND REGEN_OK=TRUE
AND $C_{regen}$>threshold It will be noted that the REGEN function can be activated under certain limitations even in modes 3, 4 and 5.

Transition T13
Transition T13 corresponds to the transition "ALTERNATOR=>BOOST" and is activated if and only if:
FOBO_OK=TRUE
AND BOOST_OK=TRUE
AND $C_{boost}$>threshold Process 2 REGEN This is an iterative process as the fluctuating voltage component X varies with the increase in the cyclical ratio and the control parameters must be adapted to maintain the set torque value.

Transition T21
Transition T21 corresponds to the transition "REGEN=>ALTERNATOR" and is activated if and only if:
REGEN_OK=FALSE
OR $C_{regen}$<threshold Transition T23
Transition T23 corresponds to the transition "REGEN=>BOOST" and is activated if and only if:
FOBO_OK=TRUE
AND BOOST_OK=TRUE
AND $C_{boost}$>threshold Transition T24
Transition T24 corresponds to the transition "REGEN=>CONS" and is activated if and only if:
$X_{mes} > X_{max\_regen}$ To authorizer the STOP&GO function, this threshold $X_{max\_regen}$ must be selected lower than the maximum restart limit ($X_{max\_regen} < X_{max\_120°}$) while taking certain protections such as 120° start. If one wishes to maximize the regenerative braking capacity ($X_{max\_regen} > X_{max\_120°}$), it is necessary to suppress the STOP&GO function until the voltage goes back below the safety threshold $X_{max\_120°}$ Process 3 BOOST The BOOST process corresponds to a transition into an actuator mode (torque assist) with as set value the torque value $C_{boost}$. It is an iterative process as the fluctuating voltage component X diminishes over time, so it is necessary to adapt the control parameters to maintain the set value of torque. The application of the torque is done progressively so that the transitions are not noticeable.

Transition T31

Transition T31 corresponds to the transition "BOOST=>ALTERNATOR" and is activated if and only if:
FOBO_OK=FALSE
OR BOOST_OK=FALSE
OR $C_{boost}$<threshold Transition T32

Transition T32 corresponds to the transition "BOOST=>REGEN" and is activated if and only if
FORE_OK=TRUE
AND REGEN_OK=TRUE
AND $C_{regen}$>threshold Process 4 CONS This process occurs only if the final voltage after regenerative braking is above a certain threshold. The means of reducing the fluctuating voltage component X depend on the phase of use of the vehicle and have been described above in process 1.

The transition into this process is saved to memory with the aid of a flag: CONS=TRUE and according to the strategy chosen, the STOP&GO function is either suppressed by means of another flag STOP_PROHIBITED=TRUE or limited by a 120° start mode by means of the flag START_120°=TRUE.

Transition T41

Transition T41 corresponds to the transition "CONS=>ALTERNATOR".

Description of the Alternator Modes

In the following description of different alternator modes, it is considered that the variables $X_{min}$ and $X_{max}$ are the outputs of the SYSTEM SAFETY block or else are internal variables in each mode. Obviously this is a particular example of an embodiment, which does not in any way limit the scope of the present invention.

Mode 1

This is an alternator mode in which the fluctuating voltage component X is fixed at a determined value indicated by a set value.

The reference voltage may be a median value or be imposed by the vehicle control system or may even depend on the application, without this in itself limiting this operating mode.

In this mode 1, the following conditions apply to the modes REGEN and BOOST:
If $X_{mes}$>=$X_{cons}$ then (BOOST_OK=TRUE AND REGEN_OK=FALSE)
If $X_{mes}$<=$X_{cons}$ then (BOOST_OK=FALSE AND REGEN_OK=TRUE).

The reference voltage may thus be a median value between $X_{min}$ and $X_{max}$. However, depending on the applications, the reference voltage may be closer to $X_{min}$ if there are more consumer devices on the Vb network or again, closer to $X_{max}$ if there are more consumer devices on the Vb+X network.

Mode 1a

This is an alternator mode in which the fluctuating voltage component X is fixed at an optimal value.

The following conditions apply to the modes REGEN and BOOST:
If $X_{mes}$>=$X_{cons}$ then (BOOST_OK=TRUE AND REGEN_OK=FALSE)
If $X_{mes}$<=$X_{cons}$ then (BOOST_OK=FALSE AND REGEN_OK=TRUE).

The calculation of the optimal value can be done by modeling, by mapping or by interpolation in order to find the fixed voltage which is optimal in terms of the conversion of electrical energy. To this end, efficiency maps for the AC-to-DC converter in inverter mode and for the DC-to-DC converter can be used. The calculation routine or the map then finds the fluctuating voltage component X which optimizes the total efficiency r1%*r2% depending on the estimated consumptions $P_{cons14V}$ and $P_{cons+x}$. The set value is thus not fixed and adapts to changes in electrical consumption.

It will be noted that the alternator efficiency r1% depends primarily on the fluctuating voltage component X, on the speed of rotation of the machine and on the current output, while the efficiency r2% of the DC-to-DC converter depends on the voltage gap between the 2 voltage networks and on the output on the Vb network. The efficiency maxima thus rarely correspond to the same fluctuating voltage component X and the voltage chosen will thus generally be a compromise value.

Mode 2

This is an alternator mode referred to as forced alternating, in which the reference voltage becomes $X_{min}$ as soon as the measured voltage reaches $X_{max}$.

This is a mode of the "band-to-band" type between the voltages $X_{min}$ and $X_{max}$.

The following conditions apply to the modes REGEN and BOOST:
If $X_{mes}$>=$X_{max}$ then (BOOST_OK=TRUE AND REGEN_OK=FALSE)
If $X_{mes}$<=$X_{min}$ then (BOOST_OK=FALSE AND REGEN_OK=TRUE).

Mode 2a

This is an alternator mode known as free running alternating, with no set value whatsoever between $X_{min}$ and $X_{max}$. This alternating mode is effective if there are not many consumer devices and there are a lot of regenerative braking phases. As soon as consumption increases, it is often preferable to pass to another alternator mode.

The following conditions apply to the modes REGEN and BOOST:
If $X_{mes}$>=$X_{ref}$ then (BOOST_OK=TRUE AND REGEN_OK=FALSE)
If $X_{mes}$<=$X_{min}$ then (BOOST_OK=FALSE AND REGEN_OK=TRUE).

Mixed MODE

This is an alternator mode known as speed range mode. If there is sufficient storage capacity for electrical energy (supercapacitor) with respect to electrical consumption, it is possible to envisage the application of an alternator mode only to certain speed ranges, by mixing several of the alternator modes already described.

In this particular embodiment, the following conditions characterize this mixed mode:
If $N>N_{max}$ then (REGEN_OK=TRUE AND BOOST_OK=FALSE)
If $N<N_{max}$ then mode 1a This mixed mode makes it only possible to allow the transition to alternator mode over the engine speed ranges which are favorable from the point of view of the efficiency of the rotary electrical machine. It will be noted that in some cases, mode 2a can advantageously replace mode 1a for use on the highway or motorway.

Obviously, the present invention is not limited to the particular embodiments which have been described above and, depending on the applications, may give rise to different variants and modifications. Thus, in certain applications of the invention, the piloting strategies module is capable of providing the system of the vehicle with information about the external equipment to be piloted depending on information provided to the piloting strategies module regarding the situation/state of the vehicle. For example, the module may indicate to the system of the vehicle that the air conditioning compressor can be used at higher power when the module knows that the thermal engine is running g efficiently, or when the micro-hybrid system is in a REGEN mode, implying that there is energy available.

The invention claimed is:

1. A micro-hybrid system for a transport vehicle, comprising:
 a rotary electrical machine (10) suitable for being coupled mechanically to an engine (5) of said vehicle;
 an AC-to-DC converter (11);
 a DC-to-DC converter (13);
 first (12) and second (2) electrical energy reservoirs for storing electrical energy produced by said rotary electrical machine (10) and for returning said electrical energy for use by consumer devices equipping said vehicle; and
 control means (14) for controlling an operation of said micro-hybrid system;
 said control means (14) comprising piloting means (140) suitable for autonomously piloting operating modes (ALTERNATOR, REGEN, BOOST) of said micro-hybrid system according to a plurality of piloting strategies depending on information provided to said piloting means regarding an internal state of said micro-hybrid system and of a state of said vehicle;
 said piloting means (140) further suitable for piloting, in a slave mode, said operating modes (ALTERNATOR, REGEN, BOOST) in accordance with instructions contained in external demands originating from a system of said vehicle;
 said operating modes comprising the following modes:
  at least one alternator mode (ALTERNATOR; modes 1, 1a, 2, 2a, mixed);
  at least one regenerative braking mode (REGEN; REGENT1, REGEN2); and
  at least one torque assist mode (BOOST; BOOST1, BOOST2, BOOST_CONS).

2. The micro-hybrid system according to claim 1, wherein said piloting means (140) comprise monitoring means (141) which determine a situation of said vehicle and authorize and define at least partially at least one of said operating modes (ALTERNATOR, REGEN, BOOST) of said micro-hybrid system, taking into account said determination of at least one of a situation of said vehicle and of said external demands originating from said system of said vehicle.

3. The micro-hybrid system according to claim 2, wherein said monitoring means (141) comprise means (1410) for estimating said situation of said vehicle from at least one of the following situations:
 said vehicle is in an urban environment;
 said vehicle is on a highway;
 said vehicle is on a motorway.

4. The micro-hybrid system according to claim 3, wherein said operating modes comprise several alternator modes, and wherein said monitoring means (141) comprise means (1413) for authorizing and selecting an alternator operating mode of said rotary electrical machine (10) among said several available alternator operating modes (modes 1, 1a, 2, 2a, mixed) while taking into account at least said situation of said vehicle.

5. The micro-hybrid system according to claim 2, wherein said monitoring means (141) comprise means (FORE_OK, 1414, 1411) for authorizing and defining said at least one regenerative braking mode of said rotary electrical machine (10).

6. The micro-hybrid system according claim 2, wherein said monitoring means (141) comprise means (FOBO_OK, 1415, 1412) for authorizing and defining said at least one torque assist operating mode of said rotary electrical machine (10).

7. The micro-hybrid system according to claim 1, wherein said piloting means (140) comprise safety means (142) which define at least one operating limit of said micro-hybrid system on the basis of an internal representation of at least some of operational elements of said micro-hybrid system and of an external demand originating from said system of said vehicle.

8. The micro-hybrid system according to claim 7, wherein said at least one operating limit is comprised in the following operating limits of said micro-hybrid system: minimum and maximum values of an operating range of a fluctuating voltage component (X) of the micro-hybrid system (Xmin, Xmax), the calibration/diagnostic (Xcalibration), protection (Xprotection) and safety (Xsafety) values of said fluctuating voltage component (X), a maximum value (lex_max) of an exciting current of a rotor of said rotary electrical machine (10) and a maximum value (Cregen_max) of a mechanical torque to be drawn in said at least one regenerative braking mode (REGEN) of said rotary electrical machine (10).

9. The micro-hybrid system according to claim 7, wherein said internal representation covers at least the following functional elements: said rotary electrical machine (10), said AC-to-DC converter (11), said DC-to-DC converter (13) and said first (12) and second (2) electrical energy reservoirs.

10. The micro-hybrid system according to claim 1, wherein said piloting means (140) comprise state machine means (ALTERNATOR, REGEN, BOOST, BOOST_CONS) authorizing transitions (T) between said operating modes of said micro-hybrid system depending on at least monitoring information and safety information produced by said piloting means (140).

11. The micro-hybrid system according to claim 10, wherein said monitoring information and safety information are supplied respectively by said monitoring means (141) and safety means (142).

12. The micro-hybrid system according to claim 1, wherein said at least one alternator mode comprises at least one of the following five alternator modes:
 an alternator mode (mode 1) in which a fluctuating voltage component is fixed at a determined value indicated by a set value;
 an alternator mode (mode 1a) in which said fluctuating voltage component (X) is fixed at an optimal value;
 an alternator mode (mode 2) in which said set value passes to a minimum value (Xmin) when said measured fluctuating voltage component attains a maximum value (Xmax);
 an alternator mode (mode 2a) in which no set value is fixed between the minimum (Xmin) and maximum (Xmax) values of said fluctuating voltage component; and
 a mixed alternator mode (mixed mode) comprising at least two of the above modes over different operating speed ranges of said rotary electrical machine (10).

13. The micro-hybrid system according to claim 1, wherein said at least one torque assist mode comprises at least one of the following three torque assist modes:

- a torque assist mode (BOOST1) intervening following the pressing of an accelerator pedal of said vehicle;
- a torque assist mode (BOOST2) intervening when said engine is at an idle speed;
- a torque assist mode intervening when there is a change in the ratio of a gearbox of said vehicle; and
- a torque assist mode (BOOST_CONS) intended to consume available electrical energy stored in at least one of said electrical energy reservoirs.

14. The micro-hybrid system according to claim 1, wherein at least one of said first and second electrical energy reservoirs comprises at least one supercapacitor (12).

15. The micro-hybrid system according to claim 14, wherein said electrical energy reservoir comprising a supercapacitor (12) supplies an on-board network under a DC voltage (Vb+X) comprising a fluctuating voltage component (X), and the other electrical energy reservoir (2) supplies another on-board network under a substantially stable DC voltage (Vb).

16. The micro-hybrid system according to claim 1, wherein said piloting strategies module comprises means for supplying to said system of said vehicle information about external equipment to be piloted according to its knowledge of the situation/state of the vehicle.

* * * * *